United States Patent [19]

Massara

[11] Patent Number: 5,772,280
[45] Date of Patent: Jun. 30, 1998

[54] DYNAMIC ACTUATION SYSTEM FOR AN ARTICULATED HEADREST PORTION OF AN AUTOMOTIVE SEAT

[75] Inventor: Andrew J. Massara, Vargön, Sweden

[73] Assignee: Lear Corporation, Southfield, Mich.

[21] Appl. No.: 852,957

[22] Filed: May 8, 1997

[51] Int. Cl.[6] ........................................................ B60N 2/42
[52] U.S. Cl. ................................ 297/216.12; 297/216.13
[58] Field of Search ..................................... 297/408, 391, 297/61, 216.1, 216.12, 216.14, 216.13, 452.18, 344.1, 344.15, 362.12, 362.13, 404

[56] References Cited

U.S. PATENT DOCUMENTS

| | | | |
|---|---|---|---|
| 3,712,666 | 1/1973 | Stoll | 297/408 X |
| 5,082,326 | 1/1992 | Sekido et al. | 297/408 X |
| 5,104,189 | 4/1992 | Hanai et al. | 297/61 X |
| 5,310,247 | 5/1994 | Fujimori et al. | 297/216.14 X |
| 5,520,435 | 5/1996 | Fujimoto et al. | 297/61 |

FOREIGN PATENT DOCUMENTS

| | | | |
|---|---|---|---|
| 2264904 | 8/1975 | Germany | 297/216.12 |

*Primary Examiner*—Milton Nelson, Jr.
*Attorney, Agent, or Firm*—Brooks & Kushman P.C.

[57] ABSTRACT

An automotive seat assembly for use in the passenger compartment of an automotive vehicle comprising a seat portion, a seat back portion, and an adjustable back support system, the back support system controlling movement of the seat back about a relatively fixed seat track whereby backward tilting movement in response to forwardly directed high acceleration forces on the vehicle body will trigger an adjustment mechanism for a headrest carried near the upper margin of the seat back whereby the motion of the headrest relative to the passenger compartment is substantially reduced compared to the angular motion of the seat back when the seat back is moved by the acceleration forces in a rearward direction.

8 Claims, 5 Drawing Sheets

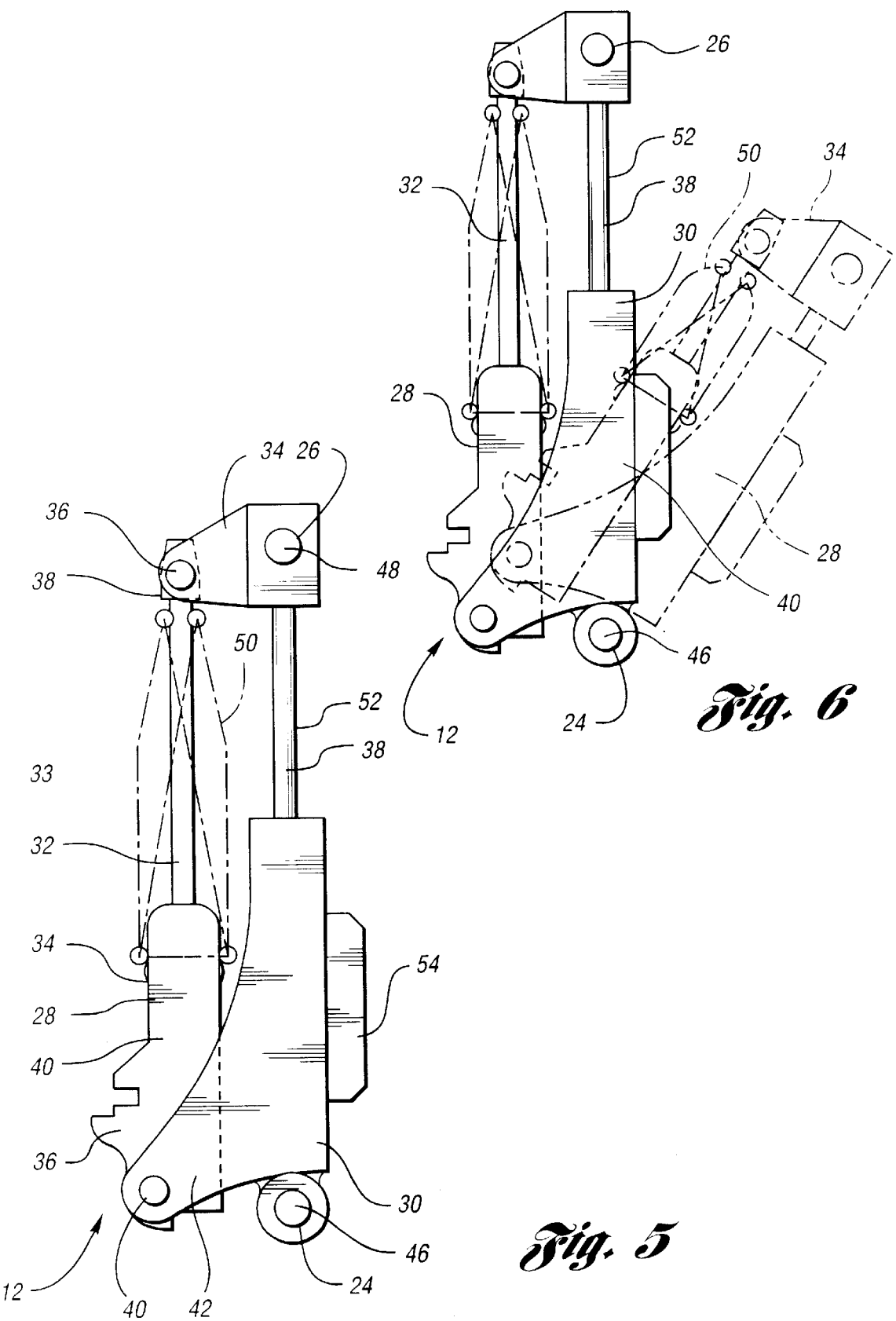

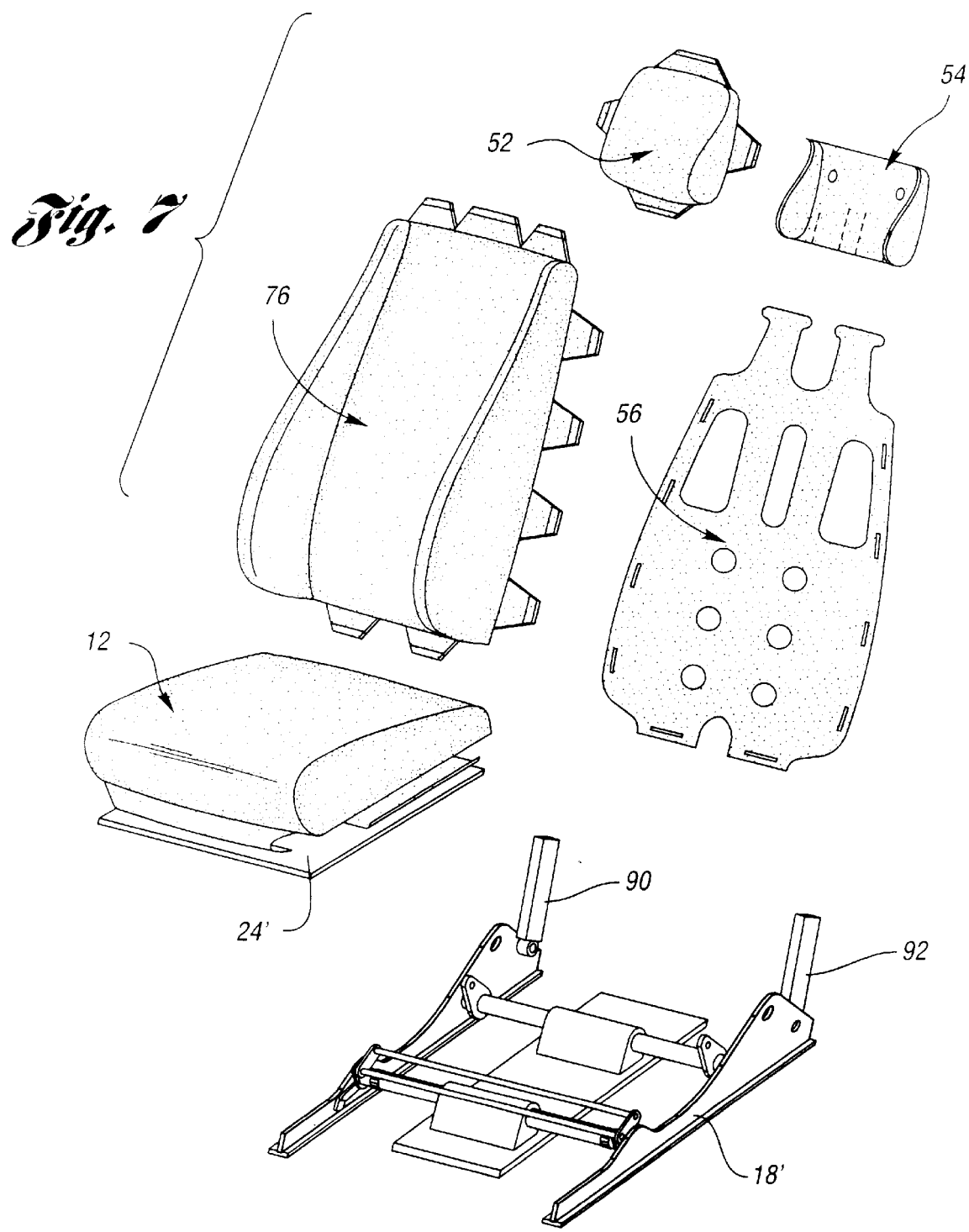

DYNAMIC ACTUATION SYSTEM FOR AN ARTICULATED HEADREST PORTION OF AN AUTOMOTIVE SEAT

TECHNICAL FIELD

The invention relates to a vehicle seat assembly for an automotive vehicle and, more particularly, to a dynamic actuator mechanism for adjusting the position of a head restraint and upper seat back relative to the lower seat back portion of the seat assembly when a high-energy impact force is applied to the vehicle.

BACKGROUND OF THE INVENTION

Head restraints for automotive seat assemblies normally are mounted at the upper margin of the seat back and are adjustably secured to seat back supporting structure. The seat back may be adjusted angularly with respect to a relatively fixed seat track secured to the vehicle passenger compartment floor pan. Upon pivotal motion of the seat back relative to the seat track, the head restraint moves throughout the same angular extent as the seat back itself.

I have disclosed in my copending application Ser. No. 08/782,404, filed Jan. 14, 1997, entitled "Vehicle Seat Energy Absorber", a recliner and energy absorption mechanism for adjusting the angularity of the seat back and for dissipating energy of a high-inertia impact force on the vehicle body, thereby permitting the seat to be adjusted relative to the seat track in a controlled fashion. This minimizes the effect of impact forces on the seat occupant. The head restraint that is used with the improved seat back assembly disclosed in my copending patent application will be adjusted with the seat back itself, the angular adjustment of the headrest coinciding with the angular adjustment of the seat back.

My copending application is assigned to the assignee of my present invention.

It is an object of my present invention to tailor the displacement of the head restraint with respect to the displacement of the seat back itself so that the special restraining requirements of the head of a seat occupant can be accommodated while the differing restraint requirements of the thoracic region of the seat occupant and the lumbar region of the seat occupant are accommodated in a different fashion when high-energy rear impact forces are applied to the vehicle body.

BRIEF DESCRIPTION OF THE INVENTION

The improved head restraint and seat back assembly of my invention meets the objective of the foregoing background discussion. It comprises a dynamic actuator system for adjusting the angularity of the head restraint relative to the seat back portion of the seat assembly. This is achieved by mounting the head restraint on a back support plate that forms a part of the seat back itself. The mounting plate may be secured to a structural shell or to other seat back structural members depending upon the particular seat design that is chosen. A back support carrier member is disposed adjacent the back support plate for the head restraint. A head restraint actuating lever is pivoted on a relatively fixed portion of the seat back.

A ram is secured to the seat back assembly, preferably in a trench or depression in the fixed portion of the seat back, and is adapted for movement in a direction parallel to the plane of the fixed seat back portion in a generally upward direction. The ram is moved in the upward direction by force-transmitting struts, one end of which is secured to a fixed point on the seat track and the other end of which is connected to the ram. In the particular embodiment I have presently disclosed, the force-transmitting struts may be a linear actuator mechanism that is used during normal angular adjustment of the seat back.

When a high-energy impact force is applied to the vehicle body from the rear, the head restraint will be adjusted forwardly relative to the seat back structure as the ram is driven upwardly by the struts to activate the head restraint adjusting mechanism. By appropriately calibrating the geometry of the actuating linkage for the head restraint and by balancing the movement of each of the elements of the head restraint actuating linkage, the travel of the head of the seat occupant resulting from a rear impact force to the vehicle body will be substantially reduced relative to the travel of the portions of the seat back assembly that support other parts of the occupant's anatomy.

BRIEF DESCRIPTION OF THE FIGURES OF THE DRAWINGS

FIG. 5 is a side elevation view of a linear actuator and a damper which may be used to control the angular motion of the seat back relative to the seat mounting structure;

FIG. 6 is a view similar to FIG. 5, which shows the linear actuator and the damper in a forwardly adjusted position; and FIG. 7 is an exploded view of the seat assembly.

PARTICULAR DESCRIPTION OF THE INVENTION

Figure 1:
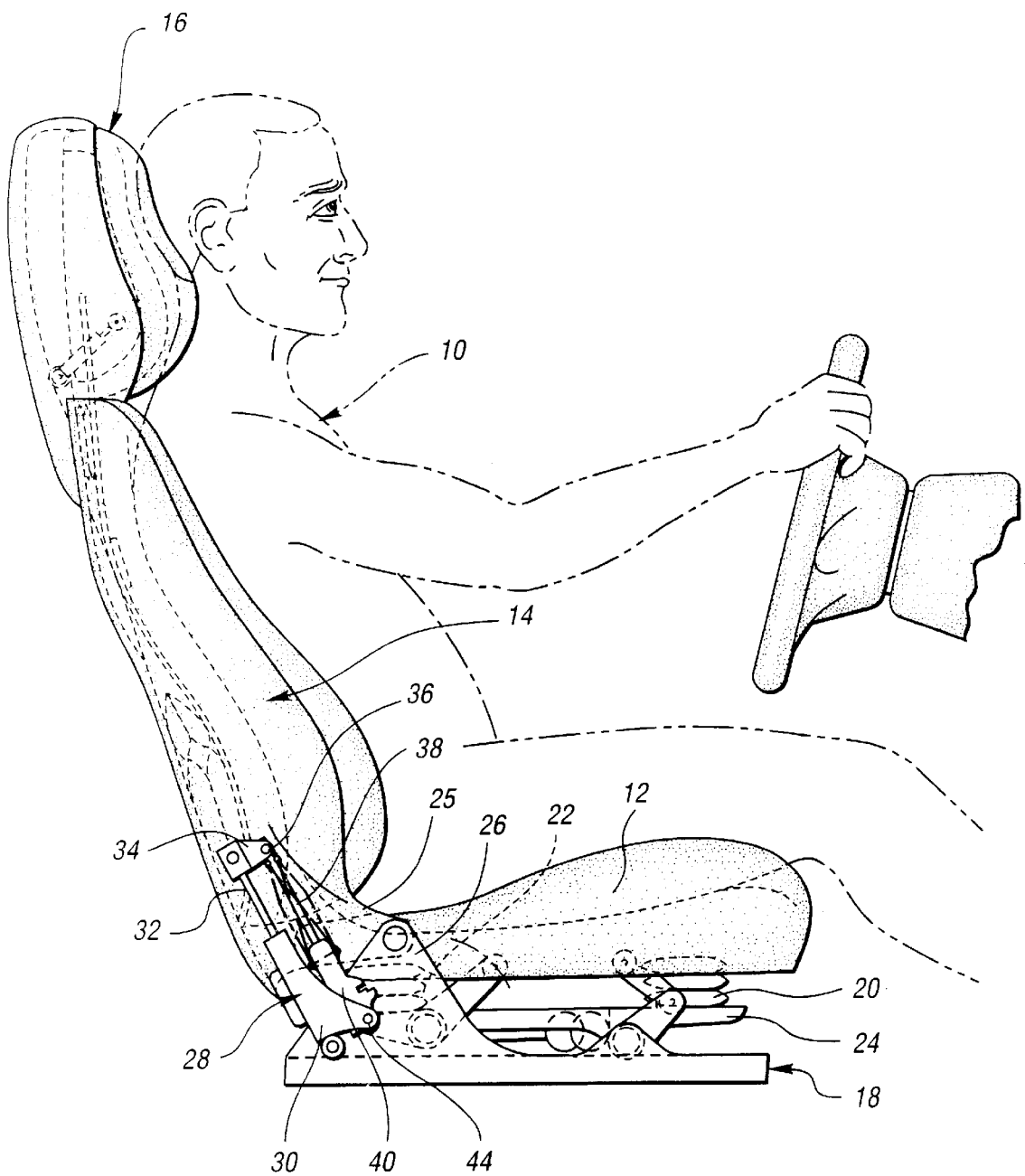
FIG. 1 shows in schematic form a side elevation view of a vehicle seat including a head restraint, a seat anchorage, a linear actuator for adjusting the angularity of the seat back and a damper for controlling the angular motion of the seat back relative to the lower seat portion.

In FIG. 1, a seat occupant represented by a dummy is shown at 10. The dummy is seated on the seat portion 12 of a seat assembly. The seat assembly includes a seat back portion 14 and a head restraint portion 16. The seat portion 12 is mounted on a seat-supporting structure which may include a seat track bracket assembly 18. Seat-supporting structures other than the particular structures shown in FIG. 1 also may be used while practicing my present invention.

In the embodiment shown in FIG. 1, a bellows suspension assembly 20 and 22 supports the seat portion 12 on a support plate 24, the latter being pinned or otherwise secured to the brackets 18. One bracket 18 would be situated on each lateral side of the seat assembly. It should be understood, of course, that any one of a variety of known seat supports may be used.

The seat back assembly in a preferred embodiment of my invention is comprised of a structural shell that includes a bracket 25 which is pinned or otherwise pivotally mounted on bracket 26, which forms a part of the bracket 18. A damper 28 having a cylinder portion 30 and an extendable rod portion 32 is joined to a clevis bracket 34 secured to the structural shell for the seat back portion of the assembly, as will be described subsequently. The clevis bracket 34 is connected by a clevis pin 36 to the actuator rod 38 of a linear actuator 40. The actuator 40 is pinned to the damper housing 30, as shown at 44.

The point of attachment of the linear actuator and damper assembly is shown in FIG. 5 at 46. This defines a pivotal connection between the actuator and damper assembly and the lower seat track shown in part at 18. The clevis bracket 34 is secured to the end of rod 32 by connecting pin 48. The end of the rod 38 is connected to the clevis 34 by clevis pin 36, as mentioned previously. Compression springs 50, seen in FIG. 5, are situated between the clevis bracket 34 and the linear actuator 40 to urge normally the seat back to its desired angular position relative to the seat track.

As illustrated in FIG. 6 by means of phantom lines, the linear actuator 40 and the damper 28 can be adjusted about the axis of the attachment point 46. The linear actuator and the damper assume the phantom line position when the seat back portion of the seat assembly is tilted rearwardly from the position shown in FIG. 1. At that time, the actuator rod 32 is moved inwardly with respect to the cylinder portion of the actuator and the rod 38 of the damper assembly also is moved. Energy is stored in the spring 50 when the actuator and the damper assemblies assume the phantom position as shown in FIG. 6.

Figure 2:
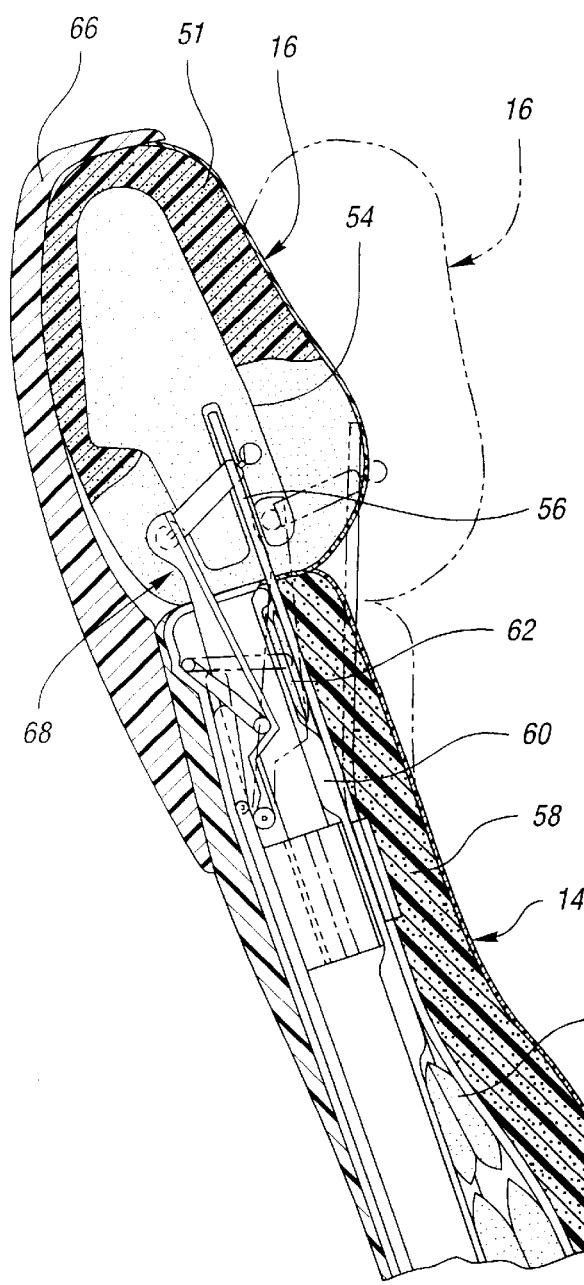
FIG. 2 is an enlarged view largely in schematic form, showing the upper portion of the seat back and the head restraint portion of the seat assembly.

As seen in FIG. 2, the head restraint 16 comprises a cushion 51 and an internal rigid structural portion 54 that supports the cushion 51. The structural portion 54 is connected to and is carried by a seat back support plate 56 which extends through the back support portion 14 of the seat assembly. The cushion for the back support portion is shown at 58.

A carrier plate, which may be a blow-molded structural plate, is shown at 60. A first bladder or other cushion is situated between the carrier 60 and the plate 56, as shown at 62. The bladder or cushion 62 is located generally at the thoracic area of the seat occupant. Similarly, another bladder or other cushion 64 is located at the lumbar region between the carrier 60 and the plate 56. The head restraint may be located in an upholstered cover 66 which may be secured to the upright seat back portion 14. The head restraint 16 can move independently of the cover 66 to the dotted line position illustrated in FIG. 2 during dynamic actuation in response to a high-energy impact force applied to the vehicle body, as will be explained subsequently.

The linkage system for adjusting the head restraint 16 to the phantom position shown in FIG. 2 is illustrated in FIG. 2 by reference numeral 68. That linkage will be described with reference to FIGS. 3 and 4.

Figure 4:
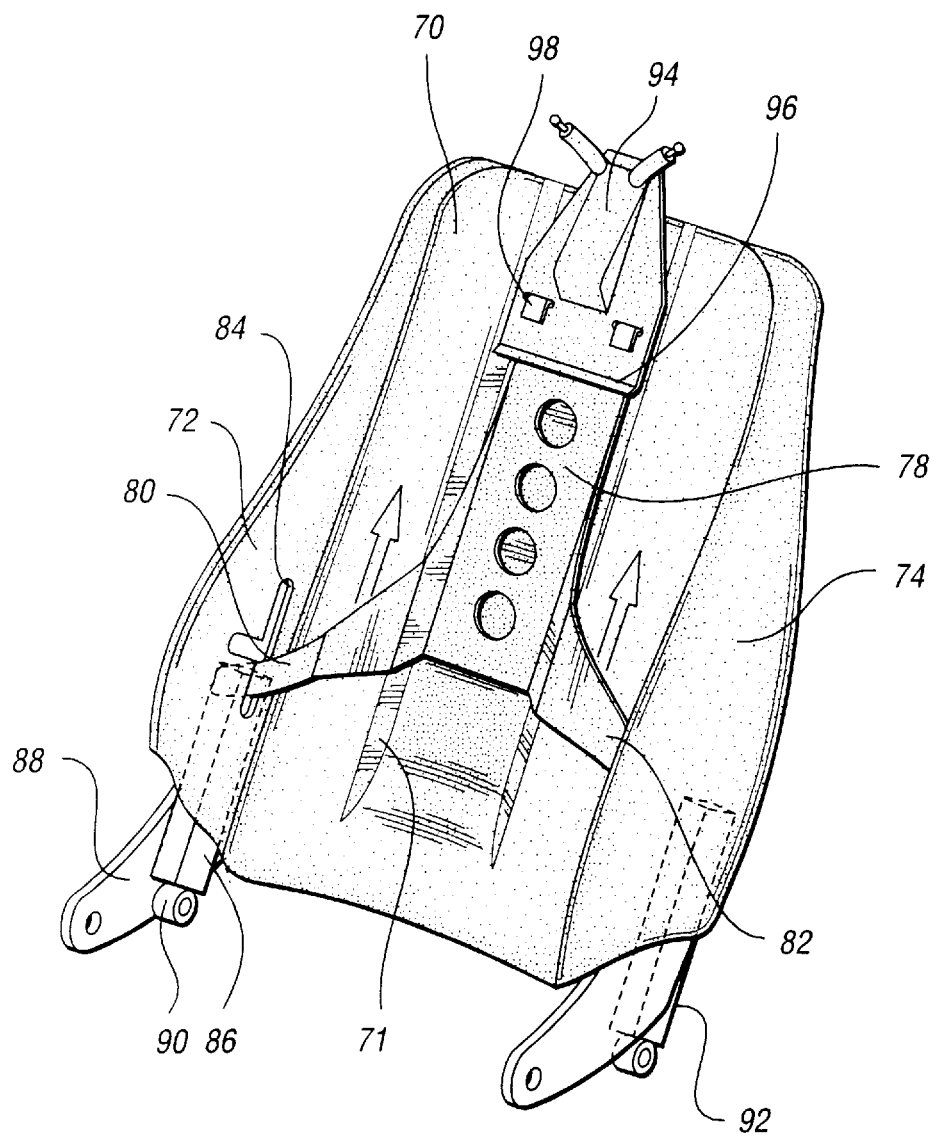
FIG. 4 is an isolated isometric view of the seat back portion of the seat assembly.

Shown in FIG. 4 is a structural shell 70 having a centrally disposed trench or depression 71 which extends generally upwardly along the center line of the seat back portion. Winged portions 72 and 74 of structural shell 70 are formed on either side of the shell and extend generally forward. The shell and the winged portions 72 and 74 receive a seat back cushion 76 generally indicated in FIG. 7.

A rigid ram 78 is positioned in the trench 71 and is guided by the trench as it is adjusted upwardly within the trench. The ram 78 includes two arms, shown at 80 and 82, which are received in guide slots, one of which is shown in FIG. 4 at 84.

An actuator link 86, seen in FIG. 4, is pinned or otherwise secured to the seat track, a suitable attachment point 90 being provided for this purpose. A similar link between the arm 82 and the seat track at the other lateral side of the structural shell is shown at 92. The structural shell 70 includes support brackets, one of which is shown at 88 in FIG. 4, which are pivotally secured to the seat track.

The links for attaching the ram to the seat track shown in FIGS. 4 and 7 are not the same as the actuator and damper assembly of FIGS. 5 and 6. Any of a variety of link designs may be used, the designs of FIGS. 5 and 6 and FIGS. 4 and 7 being merely representative. If a link design like that shown in FIGS. 4 and 7 is used, provision must be made for the seat occupant to adjust the length of the link to permit normal adjustment of the seat back angle. Such adjustable links are well known in the art.

Located at the upward portion of the structural shell 70 is a headrest damper bracket 94 which is pinned at its lower margin as shown at 96 to the structural shell. If desired, tabs 98 formed on the ram can be received through apertures formed in the bracket 94. These tabs may break loose when the bracket 94 assumes the position that will be described with reference to FIG. 3.

Figure 3:
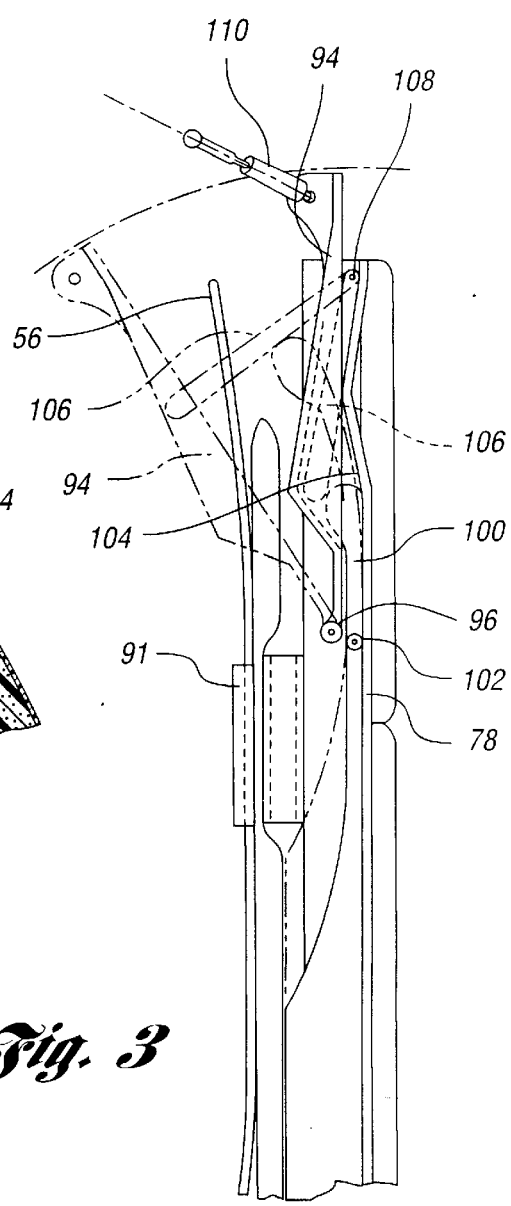
FIG. 3 is a cross-sectional view of the seat back and head restraint portion of the seat assembly as seen from the plane of section line 3—3 of FIG. 4.

As seen in FIG. 3, the ram is articulated. It comprises an upper portion 100 which is hinged at 102 to the upper margin of the main ram portion 78. The upper margin of the ram portion 100 is adapted to engage a ramp 104 formed on the structural shell. When the ram 78 moves upwardly, the portion 100 hinges at 102 and rides along the cam surface of ramp 104, thereby engaging the dynamic actuator lever 106 for the head restraint. Lever 106 is hinged at 108 to the structural shell.

When the ram 78 moves upwardly, the lever 106 is pivoted about the hinge 108 to the phantom line position shown in FIG. 3.

When the lever moves to the phantom line position shown in FIG. 3, it engages the bracket 94 and moves it to the phantom line position for the bracket 94 shown in FIG. 3.

The head restraint is connected to the bracket 94 by damper struts or links 110 seen in FIG. 3 and in FIG. 2.

Although I have shown damper links 110, other linkages, including solid linkages, can be used instead of damper links.

In FIG. 2, the damper links move from the solid line position to the phantom line position and carry with them the head restraint 16. It may be seen from a comparison of FIGS. 1 and 2 that as the seat back portion of the seat assembly moves rearwardly as a result of a high-energy rear impact, the position of the head restraint will remain relatively the same with respect to the vehicle passenger compartment, although it is adjusted forwardly relative to the seat back itself.

By appropriately balancing the geometry and the motion transmitting relationship between the linkage elements of the linkage system 68, the angular adjustment of the head restraint can be tailored to suit any ergonomic specifications that might be required for a particular seat occupant and seat design.

The plate 56 which supports the head restraint is sufficiently flexible, as indicated in FIG. 3, to permit forward adjustment of the head restraint relative to the seat back. It is secured to the carrier 60 by a bracket 91 and is hinged at its lower margin to the structural shell. It has sufficient flexure capability also to provide a cushion for the thoracic region of the occupant and the lumbar region of the occupant as thoracic forces and lumbar forces are transmitted through the seat back to the structural shell. The carrier 60 and the cushions 62 and 64 are provided for that purpose. It is not necessary for the practice of my invention, of course, to include the carrier 60 and cushions 62 and 64 as part of the seat assembly.

FIG. 4 shows rigid structural struts 86 and 92. These may be used in lieu of the linear actuators illustrated in FIG. 1. If the system of FIG. 1 is used rather than the struts shown at 90 and 92 in FIG. 4, the connection between the actuator rod and the clevis 34 is disengaged. This is accomplished by a squib release mechanism and an explosive device which deploys when a high-energy impact is sensed by remote vehicle sensors. This arrangement is described in my copending application identified above, and will not be repeated here. After the explosive device is deployed, the damper 28 will cushion the rearward movement of the seat back upon application of a high-energy rear impact force to the vehicle body. That function of the damper and linear actuator mechanism also is described in my copending application, which is incorporated in this description by reference.

Having described a preferred embodiment of my invention, what I claim and desire to secure by U.S. Letters Patent is:

What is claimed is:

1. A seat assembly for a passenger compartment of an automotive vehicle comprising a seat track, a seat portion supported by said seat track, a seat back pivotally mounted on said seat track, and a head restraint mounted at the uppermost margin of said seat back;

said seat back comprising a structural shell, a plate secured to said shell in spaced relationship therewith, said head restraint being secured to said plate;

a ram supported by said shell having an upper portion near a thoracic region of said seat assembly and a lower portion near a lumbar region of said seat assembly;

a force-transmitting strut connecting said lower ram portion to said seat track; and linkage means for connecting said upper ram portion to said head restraint;

said strut, upon pivotal movement of said seat back on said track, transmitting an upward force on said ram whereby said ram is shifted upwardly;

said linkage means being activated by said ram upon upward movement thereof, thereby moving said head restraint forward relative to said seat back.

2. The seat assembly as set forth in claim 1 wherein said linkage means includes a first head restraint lever mounted on said shell for pivotal motion about a transverse axis parallel to the pivotal axis of said seat back, a head restraint link connecting said first head restraint lever to said head restraint whereby said plate and said head restraint are moved forward relative to said seat back as said ram is moved upwardly.

3. The seat assembly as set forth in claim 2 wherein said plate is flexible at its uppermost portion whereby it is flexed upon upward movement of said cam relative to said structural shell to effect forward movement of said head restraint relative to said structural shell.

4. The seat assembly as set forth in claim 2 wherein said linkage means further includes a second head restraint lever having one end pivotally supported by said shell and another end engageable with said first head restraint lever whereby said first head restraint lever is moved pivotally about its transverse axis upon pivotal movement of said second head restraint lever.

5. The seat assembly as set forth in claim 4 wherein said second head restraint lever is engaged by said ram at a location intermediate said ends thereof, said linkage means establishing a motion transmitting ratio of movement of said ram and resulting movement of said head restraint relative to said seat back whereby the actual displacement of said head restraint relative to said passenger compartment is substantially reduced upon movement of said ram.

6. A seat assembly as set forth in claim 4 wherein said ram includes a portion intermediate said upper and lower portions of said ram, said intermediate portion being supported and guided for sliding movement in an upward direction upon pivotal movement of said seat back; and a cam surface formed on said shell adjacent said upper ram portion, said cam surface displacing said upper ram portion in a forward direction upon upward movement of said ram;

said second head restraint lever being engaged by said upper ram portion and activated thereby as said upper ram portion moves over said cam surface.

7. The seat assembly as set forth in claim 6 wherein said upper ram portion is hinged to said intermediate ram portion thereby providing an articulated ram subassembly.

8. A method for controlling movement of a head restraint for an automotive seat assembly having a seat back mounted pivotally on a seat assembly track in a vehicle passenger compartment of a vehicle body comprising;

means for effecting rearward pivotal movement of said seat back relative to said seat assembly track resulting from a high-energy impact force on said vehicle body; and means for adjusting said head restraint relative to said seat back during said pivotal movement of said seat back whereby the motion of said head restraint relative to said vehicle body is minimized.

* * * * *